Feb. 3, 1953  H. C. ENGELMAN  2,627,429
COUPLING MEANS FOR DETACHABLY JOINING PIPES
Filed Oct. 11, 1950  3 Sheets-Sheet 3

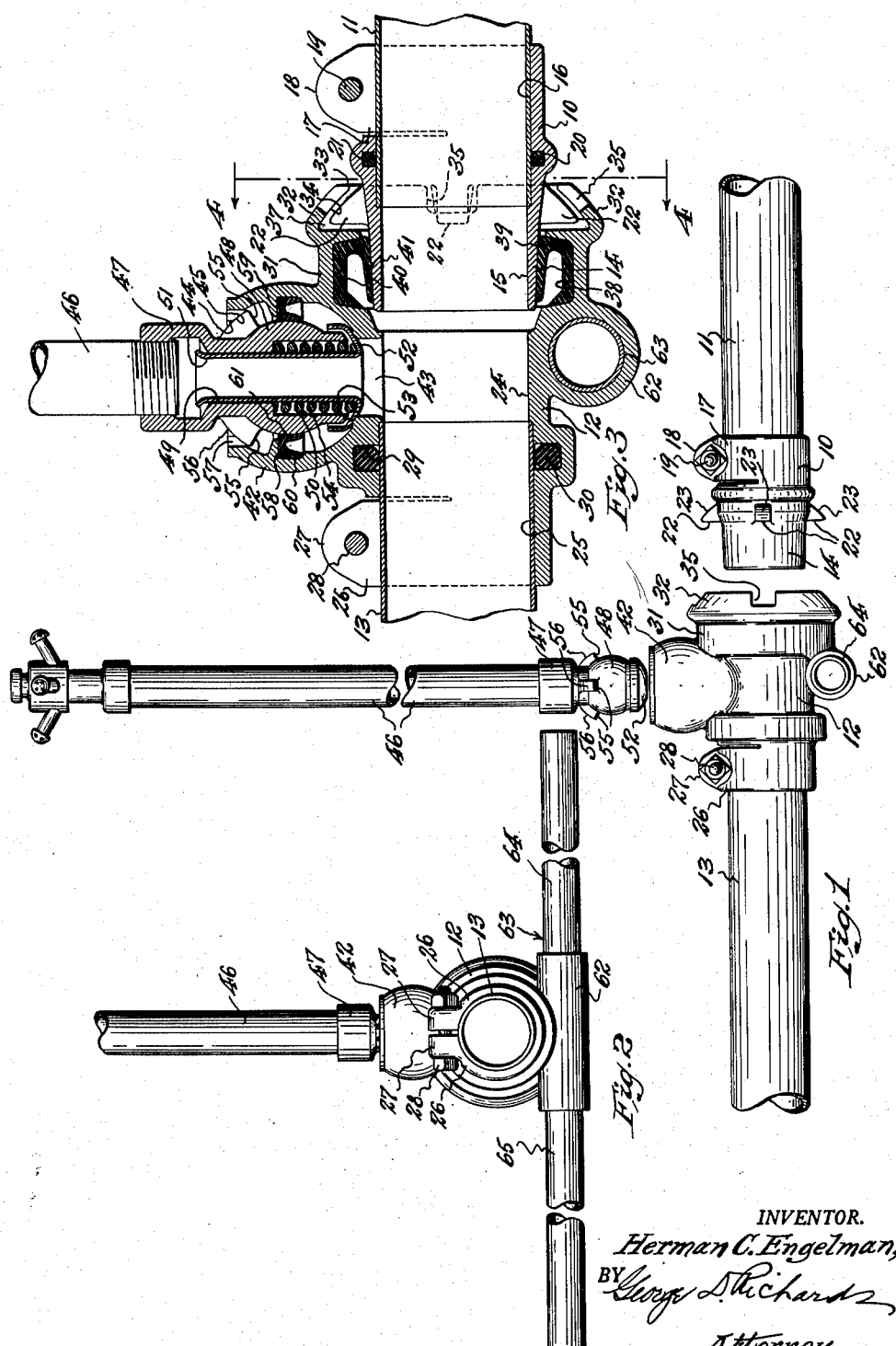

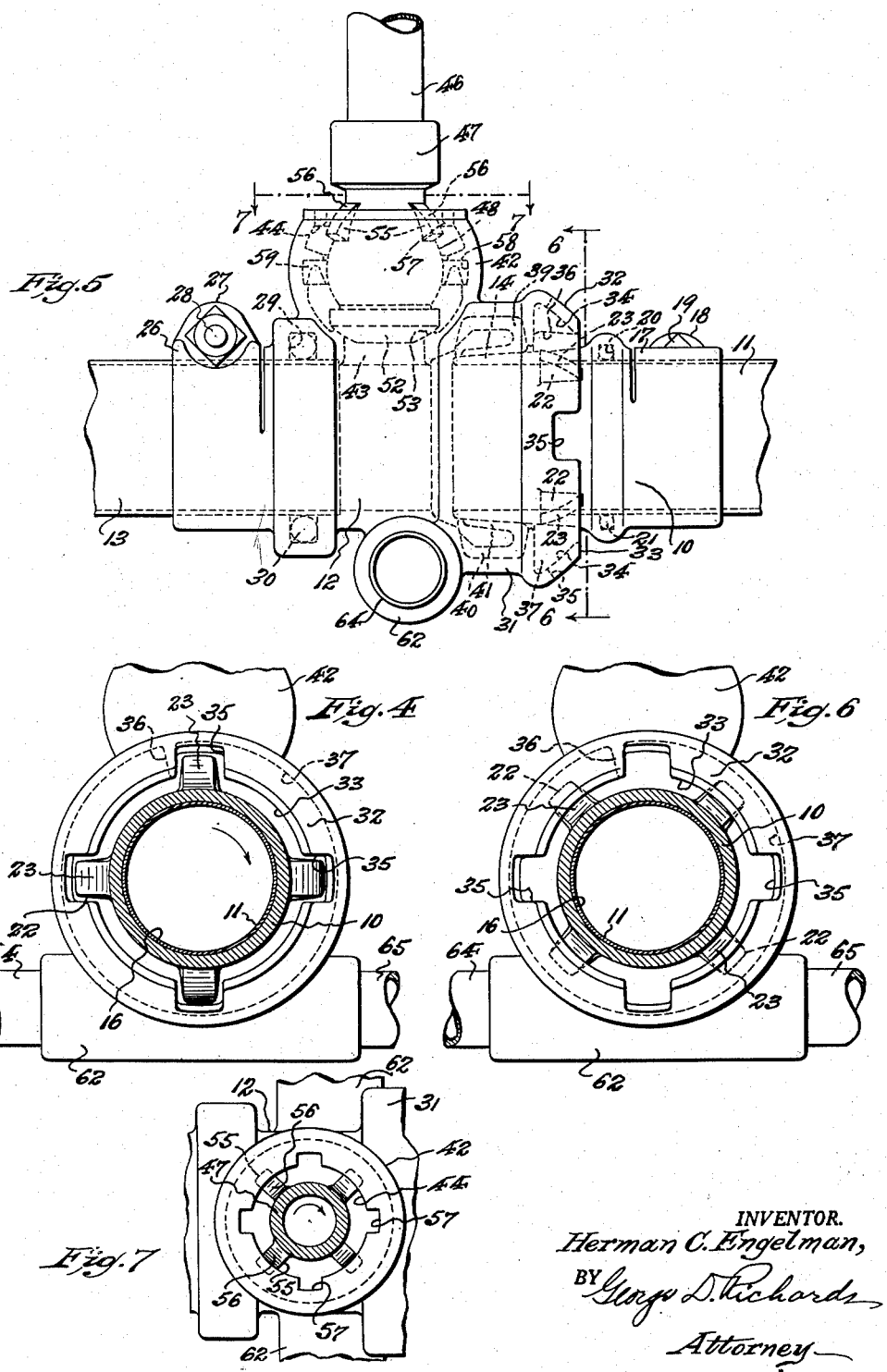

INVENTOR.
Herman C. Engelman,
BY George S. Richards
Attorney

Patented Feb. 3, 1953

2,627,429

UNITED STATES PATENT OFFICE 2,627,429

COUPLING MEANS FOR DETACHABLY JOINING PIPES

Herman C. Engelman, Staten Island, N. Y., assignor to Pausin Manufacturing Company, Inc., Newark, N. J., a corporation of New Jersey Application October 11, 1950, Serial No. 189,538

1 Claim. (Cl. 285—91)

This invention relates to improvements in coupling means for detachably and flexibly joining together lengths of pipe in portable irrigation systems, temporary fire protection lines, and pipe lines for other uses.

This invention has for an object to provide a novel coupling means for the stated purposes which comprises separable male and female coupling members provided with mating ball and socket type interlocking devices by which the same may quickly and easily be detachably connected together in pipe joining relation, and whereby, when so connected, the same can be angularly displaced or flexed relatively one to the other without occurrence of looseness, and without risk of accidental separation or "blow-out" under the pressure of fluid passing therethrough.

Another object of the invention is to provide a novel coupling means wherein the ball and socket type interlocking devices are integral parts of its male and female coupling members, and so formed in connection with the latter that, when the coupling members are joined together, the coupling means is free from externally projecting, loose or movable parts, such as manipulatable external latching or fastening devices or the like; and wherein the mating ball and socket type interlocking devices provide a flexible joint between the male and female members of such character that the load or stress applied the joint in use is evenly distributed about the entire circumference of the coupling means no matter what the relative angular displacement of the coupling members may be.

Another object of the invention is to provide a coupling means for the stated purposes the coupling members of which can be quickly joined in coupled relation by simply inserting the male member into the female member, and thereupon interlocking said members together by slight rotative turning of one relative to the other, whereby to bring their ball and socket type interlocking devices into mutually engaged operative relation.

The invention has for a further object to provide in a coupling means for the purposes stated additional cooperative coupling members, having similar ball and socket type interlocking devices, whereby a sprinkler stand pipe or other branch or lateral pipe can quickly and easily be detachably coupled to a pipe line.

Other objects of this invention, not at this time more particularly enumerated, will be understood from the following detailed description of the same.

An illustrative embodiment of the invention is shown in the accompanying drawings, in which:

Fig. 1 is a side elevational view of coupling means according to this invention, with cooperative coupling members in separated relation; and Fig. 2 is an end elevation viewed from the left in Fig. 1, but with coupling members engaged in operative coupled together relation.

Fig. 3 is a longitudinal sectional view of the coupling means according to this invention with its coupling members interengaged preparatory to interlocking the same together by their ball and socket type interlocking devices, this view being drawn on an enlarged scale; and Fig. 4 is a transverse sectional view taken on line 4—4 in Fig. 3.

Fig. 5 is a side elevational view of the coupling means with its interengaged coupling members interlocked together by the ball and socket type interlocking means; Fig. 6 is a transverse sectional view, taken on line 6—6 in Fig. 5; and Fig. 7 is a cross sectional view, taken on line 7—7 in Fig. 5.

Similar characters of reference are employed in the above described views, to indicate corresponding parts.

Figure 8:
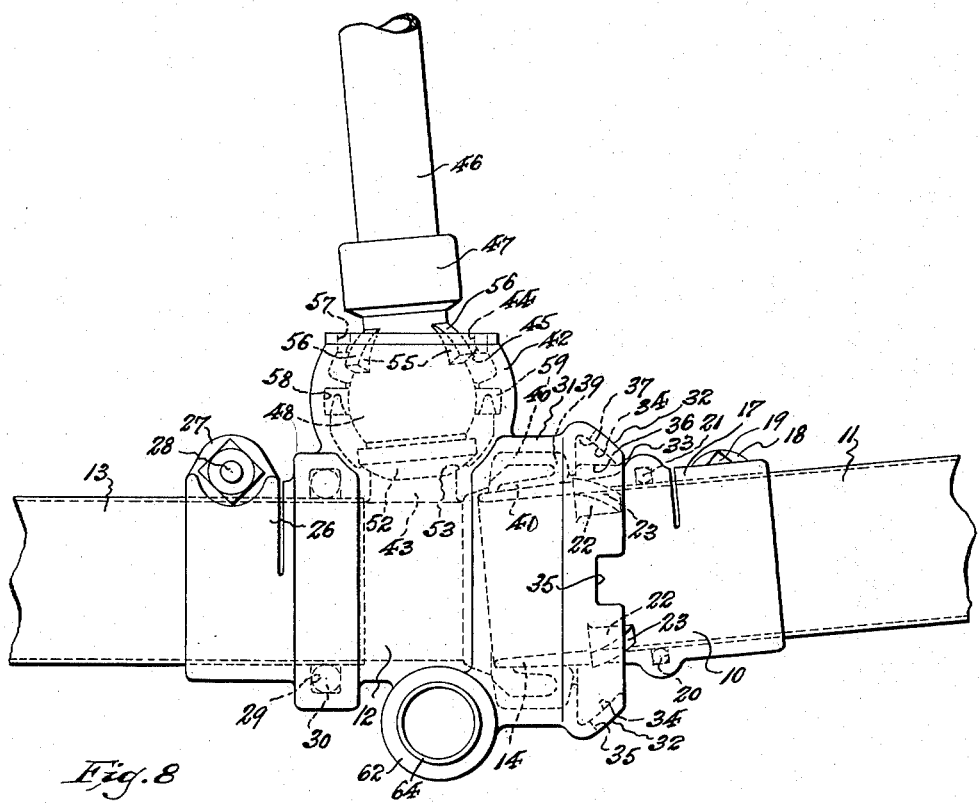
Fig. 8 is a side elevational view similar to that of Fig. 5 but showing the interlocked coupling members angularly displaced for flexing a pipe line joined thereby.

Referring to the drawings, the coupling means of this invention comprises a male coupling member 10 adapted to be secured to the end of a pipe section 11 and a female coupling member 12 adapted to be secured to the end of a pipe section 13 which is desired to be coupled to said pipe section 11 by the coupling means.

The male coupling member 10 is of generally circular cross-sectional shape and is provided at its inner or forward end with an externally tapered spigot section 14 for insertion into the receiving end of the female coupling member 12. The bore 15 of said spigot section 14 preferably corresponds in diameter to the internal diameter of the pipe section 11. The bore of the outer end portion of the male coupling member is diametrically enlarged to correspond to the external diameter of said pipe section 11, thus providing a receiving socket 16 for the reception of the end portion of said pipe section. Means is provided for firmly or rigidly securing said male coupling member 10 to the end portion of the pipe section 11. Means for this purpose may be varied and selectively provided in a form best suited to the particular kind of pipe which the coupling means is to serve. In portable irrigation systems, the pipe used is generally of a light weight, thin walled type, such e. g. as sheet metal pipe. For securing pipe of such character to the male coupling member, the outer or rearward end portion of the latter is preferably formed to provide a split contractible or constrictable clamp means comprising opposed clamp sections 17 terminating at their meeting ends in perforate ears 18 through which a locking bolt 19 is engaged. Intermediate the spigot section 14 and said clamp means, the body of the male coupling member is provided with an internal annular seating channel or groove 20 in which is housed an elastically compressible seal ring 21, or other suitable form of sealing packing, adapted to seal against the external surface of the pipe section 11, when the latter is inserted and secured in attached relation to the male coupling member.

Integrally formed with the spigot section 14 of the male coupling member 10, for radial external projection therefrom in rearwardly spaced relation to its free extremity, are a plurality of circumferentially equi-spaced projections or coupler lugs 22. The rearward faces 23 of these coupler lugs are so curved in plane as to provide sections of a convex spherical surface preferably described about a center substantially coincident with the intersection of the longitudinal axis of the spigot section with the transverse plane of its free extremity. Said projections or coupler lugs 22 as provided with such curved rear faces 23 provide the ball element of ball and socket type interlocking means by which the male and female members of the coupling means can be flexibly joined together.

The female coupling member 12 is also of generally circular cross-sectional shape, and is provided with a bore 24 which preferably corresponds in diameter to the internal diameter of the pipe section 13. The bore of the outer or rearward end portion of the female coupling member is diametrically enlarged to correspond to the external diameter of the pipe section 13, thus providing a receiving socket 25 for the reception of the end portion of the pipe section 13. Means is provided for firmly and rigidly securing the female coupling member to the end portion of the pipe section 13. As in the case of the male coupling member 10, the means for this purpose may be selectively suited to the particular kind of pipe which the coupling means is to serve, but, when the pipe comprises sheet metal or like thin wall pipe, such as preferably used in portable irrigation systems, the female coupling member is provided at its outer or rearward end portion with a split contractible or constrictable clamp means corresponding to that above described in connection with the male coupling member 10, and which comprises opposed clamp sections 26 terminating at their meeting ends in perforate ears 27 through which a locking bolt 28 is engaged. Inwardly of this clamp means, the female coupling member is provided with an internal annular seating channel or groove 29 in which is housed an elastically compressible seal ring 30, or other suitable form of sealing packing; adapted to seal against the external surface of the pipe section 13, when the latter is inserted and secured in attached relation to the female coupling member.

The inner or forward end portion 31 of the female coupling member is diametrically enlarged and terminates at its free end in an axially projecting, annular peripheral coupler flange 32, the free circular margin 33 of which defines an opening through which the spigot section 14 of the male coupling member 10 can be entered into the interior of the female coupling member. At least the internal face 34 of said coupler flange 32 is so curved in plane as to provide a concave spherical surface of a radius substantially corresponding to the radius of the convex spherical surfaces 23 of the coupler lugs 22 of the male coupling member 10, so as to be complemental thereto. Said coupler flange 32 is indented by a plurality of entrance ways or notches 35, which correspond in number and circumferential spacing to the number and circumferential spacing of the coupler lugs 22 of said male coupling member. The concave spherical internal face 34 of the coupler flange 32 provides the socket element of ball and socket type interlocking means by which the male and female members of the coupling means can be flexibly joined together. Bordering a side of at least one of said entrance ways or notches 35 is a stop web or wall 36 which extends transversely across an annular passage or way 37 intermediate the enlarged end portion 31 of the female coupling member and said coupler flange 32 which extends from the external marginal periphery thereof.

Provided in the enlarged end portion 31 of the female coupling member is an internal annular seating channel or groove 38 in which is housed an annular sealing gasket 39 of resilient material. This sealing gasket is of substantially U-shape in cross-section, whereby to provide spaced apart inner and outer annular flange portions 40 and 41. These flange portions lie substantially parallel to the longitudinal axis of the female coupling member, with the space intermediate the same open toward the interior of said female coupling member. The inner flange portion 40 is resiliently flexible and is normally somewhat inclined across the path of entering movement of the spigot section 14 of the male coupling member 10 into the interior of the enlarged end portion 31 of the female coupling member, and thus being yieldably urged by its resiliency into sealing contact with the entered spigot section 14. Said U-shaped gasket 39 being open toward the interior of the female coupling member, fluid under pressure flowing through the coupling means enters the interior of said gasket so that the pressure of the fluid thrusts against and strongly holds the flange portion 40 in tight sealing contact with an entered spigot section 14.

To operatively connect the male and female coupling members, the male coupling member 10 is opposed to the open end of the female coupling member 12 with the coupler lugs 22 of the former aligned with the entrance ways or notches 35 in the coupler flange 32 of the latter. When the coupling members are so related, the spigot section 14 of the male coupling member is entered in the female coupling member so as to be engaged by the flange portion 40 of the sealing gasket 39, and so that the coupler lugs 22 pass through the entrance ways or notches 35 of the coupler flange 32 and into the annular passage or way 37 behind the latter (see Figs. 3 and 4), whereupon the male coupling member 10 is rotated so as to engage said coupler lugs 22 behind the coupler flange 32 (see Figs. 5 and 6), thus interlocking the coupling members together. When fluid is passed through the thus joined coupling members so as to normally flow from the female coupling member through the male coupling member, the thrust of the fluid brings the ball or convex faces 23 of the coupler lugs 22 into meeting engagement with the socket or concave face 34 of the coupler flange 32, thus establishing a ball and socket interlocking connection between the male and female coupling members.

The ball and socket connection provides a flexible jointure of the coupling members so that they are capable of a substantial degree of relative angular displacement in any desired direction (see Fig. 8), thus providing a universal flexible connection between pipe sections which are coupled together thereby. It will be noted that the center about which the coupling members swing is within the coupling interior, and preferably in substantial register with the axis of the spigot section 14 in the plane of the end of the latter, and consequently no appreciable change of internal cross-sectional area occurs as a result of relative angular displacement of the coupling members. The ball and socket interlocking elements being also entirely within the interior of the coupling, with the ball elements thereof uniformly spaced around the circumference of the coupling, it follows that all stresses are equally distributed about the axes of the coupling members in any angularly displaced relation in which they may be disposed. By reason of this no looseness can occur at any point, and all risk of separation or "blow-out" under pressure of fluid flow is eliminated. Furthermore, the ball and socket type of interlock thus provided between the coupling members avoids necessity of external locking or latching devices or other exteriorly projecting or loose parts which are subject to break down or injury likely to defeat the usefulness of a coupling.

As thus far described, the coupling means according to this invention is complete in itself and is well adapted for use in portable pipe line construction for any purpose. When, however, the coupling means is to be used in the construction of portable irrigation pipe lines, it is frequently desirable to additionally provide means for detachably connecting sprinkler stand pipes to the pipe line system at suitable intervals. With this in view, the present invention further includes means for detachably connecting a sprinkler stand pipe to the female member 12 of the coupling means. To this end, the mid-portion of the female coupling member is provided with an upstanding female coupling member 42 which is open at its upper free end, and which communicates with the interior of the main female coupling member 12 through a port 43. The open upper end of the female coupling member 42 is provided with an internal annular coupler flange 44 having at its under side a concave spherical internal face 45. This concave spherical face 45 provides the socket element of ball and socket type interlocking means.

Suitably affixed to the lower end of a sprinkler stand pipe 46, as by threading the same thereto, is a male coupling member 47 which is provided with a spherical bearing member 48 of such diameter as to readily pass the annular coupler flange 44 with which the upper open end of the female coupling member 42 is provided. The male coupling member 47 is provided with an axial bore 49 having a diametrically enlarged lower portion 50. Axially movable in the bore 49 is the tubular shank 51 of an annular footing member 52 having a convex bottom face concentric to the bearing member 48, which is adapted to bear or seat against a conforming annular concave seat 53 which surrounds the port 43 of the female coupling member 42. Supported within the enlarged lower portion 50 of the bore 49 of the male coupling member 47 is a compression spring 54. This compression spring exerts downward thrust against the footing member 52. Integrally formed in connection with the upper end of the spherical bearing member 48, for radial projection therefrom, are a plurality of circumferentially equi-spaced projections or coupler lugs 55. The upper faces 56 of the coupler lugs 55 are so curved as to be concentric to the spherical bearing member 48. As so formed, the coupler lugs 55 are adapted to conform to and mate with the concave spherical face 45 of the coupler flange 44 of the female coupling member 42, and provide the ball element of ball and socket type interlocking means by which the male and female coupling members 47 and 42 can be flexibly united.

The coupler flange 44 is indented by a plurality of entrance ways or notches 57, which correspond in number and circumferential spacing to the number and circumferential spacing of the coupler lugs 55.

Intermediate the ends of the chambered interior of the female coupling member 42, the wall thereof is provided with an internal annular seating channel or groove 58 in which is housed an annular sealing gasket 59 of resilient material. This sealing gasket 59 is of substantially U-shape in cross-section, whereby to provide spaced apart outer and inner annular flange portions 60 and 61. These flanges lie substantially parallel to the longitudinal axis of the female coupling member 42, with the space intermediate the same open toward the port 43. The inner flange portion 61 is resiliently flexible, and is adapted to engage and seal against the sides of the spherical bearing member 48 of the male coupling member 47, when the latter is coupled to the female coupling member 42. Said sealing gasket 59 being open toward the port 43, fluid under pressure flowing through the united coupling members 42 and 47 enters the interior of said gasket and strongly holds the flange portion 61 in tight sealing contact with the spherical bearing member 47.

To operatively unite the male coupling member 47 with the female coupling member 42, the former is opposed to the open end of the latter with the coupler lugs 55 aligned with the entrance ways or notches 57 of the coupler flange 44, whereupon the male coupling member 47 is inserted into the interior of the female coupling member 42, to dispose said coupler lugs below the coupler flange 44 (see Fig. 3). The male coupling member 47 is rotated so as to engage the coupler lugs 55 with the concave spherical face 45 of said coupler flange, thus interlocking the male and female coupling members 47 and 42 together. When the coupling members are thus united, the compression spring 54 will exercise a downward tensional thrust upon the footing member 52, whereby to frictionally bind the latter against the seat 53, and at the same time will exercise an upward tensional thrust upon the male coupling member 47, whereby to frictionally bind the coupler lugs against the socket face 45 of the coupler flange 44 of the female coupling member. Due to the ball and socket type connection between male and female coupling members 47 and 42, the sprinkler stand pipe may be angularly disposed or inclined in any desired direction, whereby to attain desired direction of discharge of fluid to desired areas adjacent to the irrigation pipe line, and by reason of the frictionally bound relation of the male coupling member 47 relative to the female coupling member 42, the sprinkler stand pipe will be sustained against displacement from any such angularly adjusted disposition.

As in the case of the main coupling means, in the sprinkler stand pipe coupling means the ball and socket interlocking devices are within the interior of the assembled coupling, and avoid all necessity for use of external locking or latching devices, or like external parts.

From the above, it will be obvious that both the main coupling means and the sprinkler stand pipe coupling means can be quickly and easily assembled and disassembled by very simple manipulation thereof. By reason of this, not only can a pipe line be quickly constructed in a given area, but as quickly disassembled for carriage to and reassembly in other areas with a minimum expenditure of time and labor.

In portable pipe line construction, involving the laying of the line across uneven and irregular surfaces, it is desirable to provide means to support and stabilize the line against both accidental lateral or rotative shift and against stresses and strains. This is done by providing at suitable intervals along the line base footing and bracing means. Such means should be simple in form and subject to easy assembly and disassembly in connection with the line. It being an object of this invention to provide a simple and efficient basing and bracing means, to this end, the body of the main female coupling member 12 is provided, in connection with the underside thereof, with a transverse tubular socket 62 which is unitary therewith, and preferably an integral part thereof. Through this socket can be detachably engaged a suitable length of pipe 63 which, when in place, provides oppositely and laterally extending base footing and bracing members 64 and 65 (see Fig. 2), thus firmly supporting and bracing the pipe line structure against shift and strain.

Having now described my invention, I claim:

A pipe coupling comprising separable male and female coupling members each having means at a rearward end thereof for affixing the same respectively to ends of pipes to be joined by the coupling, said male member having a tapered spigot section, said female member having an open end portion to receive said spigot section and an annular seating channel within said open end portion, a resilient sealing gasket of inwardly open U-shaped cross-section having an outer flange supported within said seating channel and a flexible inner flange to embrace and seal against the entered spigot section, the male member having external radially projecting coupler lugs circumferentially spaced around the same and rearwardly spaced from the free extremity of the spigot section, and said female member having an annular coupler flange outwardly offset from and concentric to its open end portion, said coupler flange having entrance ways circumferentially spaced correspondingly to the circumferential spacing of said coupler lugs through which the latter can pass when the spigot section is entered into the open end portion of the female member, the inner surface of said coupler flange and the outer faces of the coupler lugs having complementary spherical surfaces adapted to be brought into mating engagement when the joined coupling members are relatively rotated, whereby to provide a ball and socket connection between said members to permit relative angular displacement thereof while maintaining the same in interlocked and sealed together relation, the curvature of said complementary spherical surfaces being concentric to a point aligned with the longitudinal axis of the spigot section and approximately coincident with the transverse plane of the free end of said spigot section as operatively disposed within and connected to the female member, whereby symmetrical aligned opposition of the open end of the entered spigot section to the bore of the female member remains substantially unchanged when the male member is angularly disposed relative to the female member.

HERMAN C. ENGELMAN.

REFERENCES CITED

The following references are of record in the file of this patent:

UNITED STATES PATENTS

| Number | Name | Date |
|---|---|---|
| 713,347 | Reilly | Nov. 11, 1902 |
| 1,639,800 | Gillick | Aug. 23, 1927 |
| 1,915,100 | McLaughlin | June 20, 1933 |
| 2,087,916 | Lanninger | July 27, 1937 |
| 2,221,284 | Folson | Nov. 12, 1940 |
| 2,432,224 | Bradfield | Dec. 9, 1947 |

FOREIGN PATENTS

| Number | Country | Date |
|---|---|---|
| 20,635 | Great Britain | 1892 |
| 469,997 | Great Britain | Aug. 6, 1937 |